United States Patent Office 3,197,517
Patented July 27, 1965

3,197,517
CONVERSION OF o-DIISOPROPYLBENZENE AND 3,4-DIISOPROPYLTOLUENE TO INDENES AND NAPHTHALENES
Frederick J. Soderquist, Essexville, Harold D. Boyce, Coleman, and Jerome H. Stickelmeyer, Midland, Mich., assignors to The Dow Chemical Company, Midland, Mich., a corporation of Delaware
No Drawing. Filed Jan. 22, 1962, Ser. No. 167,926
9 Claims. (Cl. 260—668)

This invention concerns a method for converting o-diisopropylbenzene and homologous 3,4-diisopropyltoluene, hereinafter referred to as o-DIPB and 3,4-DIPT, respectively, to indenes and naphthalenes by means of a simultaneous demethanation and cyclization reaction. By "indenes" is meant indene and methylindene and by "naphthalenes" is meant naphthalene, isomeric monomethylnaphthalenes and isomeric dimethylnaphthalenes.

Elwell has shown in U.S. Patent 2,531,328 that indene and methylindene can be prepared by dehydrogenating o-ethyltoluene or ethylxylenes wherein a methyl and an ethyl group are adjacent on the benzene ring.

It has now been discovered that indenes and naphthalenes can be prepared by a simultaneous demethanation and cyclization of o-DIPB and of 3,4-DIPT. The demethanation and cyclization reaction is carried out by passing o-DIPB or 3,4-DIPT or mixtures thereof through a reaction zone maintained at a temperature ranging between 525° and 800° C. and preferably between 600° and 700° C. at a throughput rate between 5 and 150 grams of o-DIPB or of 3,4-DIPT (or mixtures thereof) per 100 ml. of reaction zone per hour or, alternatively, through a reaction zone containing a dehydrogenation catalyst maintained at the same temperature and at the same throughput rate, and recovering indenes and naphthalenes from the so-processed feed. The process is advantageously carried out continuously, with recycling of the unconverted feed to the process stream.

The feed ideally is pure o-DIPB or pure 3,4-DIPT or mixtures thereof. However, crude or commercial o-DIPB or 3,4-DIPT cuts or their mixtures also containing m- and p-DIPB and/or isomers of 3,4-DIPT and advantageously containing at least 50 mole percent of o-DIPB and/or 3,4-DIPT are economically advantageous.

When a catalyst is used in the demethanation and cyclization reaction, the catalyst can be any conventional dehydrogenation catalyst, i.e., activated alumina or bauxite, mixtures of activated alumina or bauxite with heavy metal oxides, the Kearby basic ferric oxide, zinc oxide and magnesium oxide catalysts and mixtures thereof which are self-reactivating in the presence of steam, e.g., those disclosed in U.S. Patents 2,395,875 and 2,426,829, chromium oxide and the like.

In practice, o-DIPB and/or 3,4-DIPT feed is passed through a reaction zone maintained at a temperature between 525° and 800° C. which may contain a dehydrogenation catalyst, as specified, at a throughput rate between 5 and 150 grams of feed per 100 ml. of reaction zone per hour or per 100 ml. of catalyst per hour. Indenes and naphthalenes are recovered from reactor effluent while unconverted o-DIPB and/or 3,4-DIPT are recycled to the process stream. When o-DIPB is the feed, upon demethanation and cyclization indene and methylindene, both reported as indene, are formed, together with naphthalene, isomeric monomethylnaphthalenes and isomeric dimethylnaphthalenes. When 3,4-DIPT is the feed, upon demethanation and cyclization indenes, isomeric monomethylnaphthalenes and isomeric dimethylnaphthalenes are similarly formed. Since the indenes and naphthalenes are separable by fractional distillation under vacuum, it is no less advantageous to demethanate and cyclize mixtures of o-DIPB and 3,4-DIPT.

Inert diluents, e.g., steam, benzene, toluene, isomeric xylenes, carbon dioxide, nitrogen, argon and helium, may be used as desired. The amount or kind of inert diluent is not material, in general. However, a steam diluent is particularly advantageous when self-regenerating basic dehydrogenation catalysts are used, advantageously in a proportion of ca. 2.5 lb. or more of steam per lb. of feed.

Reactor effluent is condensed and fractionally distilled, preferably under vacuum and in the presence of an added polymerization inhibitor which inhibits polymerization of vinylaromatic monomers, e.g., 4-tert.-butylcatechol, 4,6-dinitro-o-cresol, 2,6-diisopropyl-o-cresol, 3,6-dimethoxyphenol, o-nitrophenol, hydroquinone, o-phenylphenol, etc. There are recovered product indenes and naphthalenes, each in a form substantially free of the other. Unconverted o-DIPB and/or 3,4-DIPT is then recycled to the process stream. A fractionating or distilling column operated advantageously at ca. 1–2.5 mm. Hg absolute at a reflux ratio of 25–40 to 1 is advantageously used.

The following examples describe completely representative specific embodiments and the best mode contemplated by the inventors of carrying out the inventive process. The examples are illustrative and not in limitation of the invention which is defined in the claims.

Example 1 o-DIPB is vaporized, preheated in conjunction with steam and passed over 70 ml. activated alumina catalyst, ¼ inch to 8 U.S. mesh size, at a series of temperatures from 625° C. to 700° C. A feed rate of approximately 20.5 g. hydrocarbon per hour is used. Steam throughput is 58.25 g. per hour. The product is recovered by condensation and fractional distillation through a Podbielniak analytical column operated at ca. 1–2.5 mm. Hg absolute at a head temperature of 20.5° C. initially and 93° C. finally and at a reflux ratio varying between 40:1 and 25:1. A quantity of 0.665 percent 4-tert.-butyl-catechol, based on reactor effluent condensate, is added to prevent polymerization. Mass spectrometric and infrared techniques are used to identify product indenes and naphthalenes. Samples are taken at the following temperature levels: 625° C., 650° C., 675° C. and 700° C. Contrary to expectations, diisopropenyl and isopropyl isopropenylbenzenes are formed in only nominal amounts at all temperatures tried; but the formation of indenes and naphthalenes is appreciable and increases rapidly as the temperature is raised. Conversion and yield data are tabulated in following Table I.

*Table I*

CATALYTIC DEMETHANATION AND CYCLIZATION OF o-DIISOPROPYLBENZENE

[Activated $Al_2O_3$ catalyst]

| | | | | |
|---|---|---|---|---|
| HC [1] Input (g.) | | 82 | | |
| Steam Input (g.) | | 233 | | |
| Hours Operation | | 4 | | |
| HC Recovered | | 54 | | |
| Operating Temp., °C | 625 | 650 | 675 | 700 |
| Crude Product Analysis (wt. percent): | | | | |
| Benzene | 1.0 | 1.0 | 1.0 | 1.0 |
| Toluene | 0.8 | 0.6 | 1.0 | 2.0 |
| Styrene | 0.2 | 0.2 | 1.0 | 3.0 |
| Ethylbenzene | 2.0 | 2.0 | 2.0 | 3.0 |
| Indene | 2.0 | 4.0 | 7.0 | 8.0 |
| α-Methylstyrene | 3.0 | 5.0 | 8.0 | 10.0 |
| Isopropylbenzene | 13.0 | 11.0 | 6.0 | 3.0 |
| Naphthalene | 1.0 | 0.9 | 4.0 | 12.0 |
| Divinylbenzene | 1.0 | 2.0 | 3.0 | 3.0 |
| Isopropenyltoluene or ethylvinylbenzene | | | | 2.0 |
| Isopropyltoluene or diethylbenzene | | | | |
| Methylnaphthalene | 2.0 | 3.0 | 8.0 | 17.0 |
| Vinyl isopropenylbenzene | 2.0 | 2.0 | 3.0 | 3.0 |
| Vinyl isopropylbenzene or ethyl isopropenylbenzene | 5.0 | 5.0 | 5.0 | 4.0 |
| Dimethylnaphthalenes | 0.6 | 0.7 | 2.0 | 3.0 |
| Diisopropenylbenzene | 0.5 | 0.5 | 0.9 | 1.0 |
| Isopropyl isopropenylbenzene | 4.0 | 4.0 | 6.0 | 4.0 |
| Diisopropylbenzene | 61.9 | 58.1 | 42.1 | 21.0 |
| Lb. naphthalenes/100 lb. feed | 2.4 | 3.0 | 9.2 | 21.1 |
| Lb. naphthalenes/100 lb. HC consumed | 4.1 | 4.9 | 12.7 | 24.5 |
| Lb. indene/100 lb. feed | 1.3 | 2.6 | 4.6 | 5.3 |
| Lb. indene/100 lb. HC consumed | 2.2 | 7.9 | 6.4 | 6.2 |
| Lb. isopropyl isopropenylbenzene/100 lb. HC feed | 2.6 | 2.6 | 4.0 | 2.6 |
| Lb. isopropyl isopropenylbenzene/100 lb. HC consumed | 4.4 | 4.2 | 5.5 | 3.0 |
| Lb. diisopropenylbenzene/100 lb. feed | 0.3 | 0.3 | 0.6 | 0.7 |
| Lb. diisopropenylbenzene/100 lb. HC consumed | 0.5 | 0.5 | 0.8 | 0.8 |

[1] HC=hydrocarbon.

Similar advantageous results are obtained when 3,4-DIPT is substituted for o-DIPB.

EXAMPLE 2

In a manner similar to that of Example 1, o-DIPB is passed over a $ZnO$—$Fe_2O_3$ self-reactivating catalyst, as described in U.S. Patent 2,963,518, Example 9b, at the same temperatures. In this case, the hydrocarbon throughput rate is 16.75 g. per hour, the steam throughput rate is 54.0 g. per hour and the catalyst volume is 70 ml. Again, after recovery of the crude product at the same four temperature levels and analysis of the same, it is found that the formation of the normally expected diisopropenyl and isopropyl isopropenylbenzenes is extremely low, while the formation of naphthalenes and indenes is appreciable and increases as the temperature is raised. Conversion and yield data are tabulated in following Table II.

*Table II*

CATALYTIC DEMETHANATION AND CYCLIZATION OF o-DIISOPROPYLBENZENE

[$ZnO$—$Fe_2O_3$ catalyst]

| | | | | |
|---|---|---|---|---|
| HC Input (g.) | | 67 | | |
| Steam Input (g.) | | 216 | | |
| Hours Operation | | 4 | | |
| HC Recovered | | 57 | | |
| Operating Temp., °C | 625 | 650 | 675 | 700 |
| Crude Product Analysis (wt. percent): | | | | |
| Benzene | 2.5 | 0.4 | 0.4 | 1.0 |
| Toluene | 2.0 | 1.0 | 1.0 | 2.0 |
| Styrene | 2.0 | 0.8 | 1.0 | 3.0 |
| Ethylbenzene | 2.0 | 2.0 | 2.0 | 3.0 |
| Indene | 4.0 | 4.0 | 5.0 | 8.0 |
| α-Methylstyrene | 2.0 | 2.0 | 5.0 | 7.0 |
| Isopropylbenzene | 1.0 | 2.0 | 4.0 | 6.0 |
| Naphthalene | 2.0 | 2.0 | 3.0 | 7.0 |
| Divinylbenzene | 1.0 | 1.0 | 2.0 | 3.0 |
| Isopropenyltoluene or ethylvinylbenzene | | | | 4.0 |
| Isopropyltoluene or diethylbenzene | 3.0 | 2.0 | 1.0 | 1.0 |
| Methylnaphthalene | 3.0 | 3.0 | 4.5 | 5.0 |
| Vinylisopropenylbenzene | 2.0 | 2.0 | 3.0 | 3.0 |
| Vinyl isopropylbenzene or ethyl isopropenylbenzene | 3.0 | 4.0 | 6.0 | 6.0 |
| Dimethylnaphthalenes | 1.0 | 0.9 | 0.8 | 0.7 |
| Diisopropenylbenzenes | 2.0 | 1.0 | 0.8 | 0.6 |
| Isopropyl isopropenylbenzene | 3.0 | 2.0 | 2.0 | 2.0 |
| Diisopropylbenzene | 64.5 | 69.9 | 59.0 | 37.7 |
| Lb. naphthalenes/100 lb. feed | 5.1 | 5.1 | 7.1 | 10.8 |
| Lb. naphthalenes/100 lb. HC consumed | 11.3 | 12.6 | 14.3 | 15.9 |
| Lb. indene/100 lb. feed | 3.4 | 3.4 | 4.3 | 6.0 |
| Lb. indene/100 lb. HC consumed | 7.5 | 8.4 | 8.6 | 8.8 |
| Lb. isopropyl isopropenylbenzene/100 lb. HC feed | 2.6 | 1.7 | 1.7 | 1.7 |
| Lb. isopropyl isopropenylbenzene/100 lb. HC consumed | 5.8 | 4.2 | 3.4 | 2.5 |
| Lb. diisopropenylbenzene/100 lb. feed | 1.7 | 0.9 | 0.7 | 0.5 |
| Lb. diisopropenylbenzene/100 lb. HC consumed | 3.8 | 2.2 | 1.4 | 0.7 |

EXAMPLE 3

Following Table III presents data on m- and p-diisopropylbenzenes processed in a similar manner to that of Example 1 over the catalyst described in Example 2. Feed stocks were sufficient so that larger quantities could be processed and a larger dehydrogenation unit was employed. Care was taken that space velocities and throughput rates were equivalent. As is apparent, both the m- and the p-isomer produce the normally expected products, diisopropenyl and isopropyl isopropenylbenzenes, and not indenes nor naphthalenes.

*Table III*

ATTEMPTED CATALYTIC DEMETHANATION AND CYCLIZATION OF m- AND p-DIISOPROPYLBENZENE

[$ZnO$—$Fe_2O_3$ catalyst]

| | m-DIPB | p-DIPB |
|---|---|---|
| HC Input (g.) | 61,296 | 45,310 |
| Steam Input (g.) | 177,000 | 122,400 |
| Hours Operation | 118 | 81.6 |
| HC Recovered | 54,215 | 36,446 |
| Operating Temp., °C | 630 | 635 |
| Crude Product Analysis (wt. percent): | | |
| Benzene | | 0.3 |
| Toluene | | 0.5 |
| Styrene | 0.5 | 1.4 |
| Ethylbenzene | 0.2 | |
| Indene | | |
| Vinyltoluene or α-methylstyrene | 2.2 | 1.9 |
| Isopropylbenzene | 2.3 | 2.9 |
| Naphthalene | | |
| Divinylbenzene | 0.2 | 1.1 |
| Isopropenyltoluene or ethylvinylbenzene | 0.9 | |
| Isopropyltoluene or diethylbenzene | 0.6 | 0.3 |
| Methylnaphthalene | | |
| Vinyl isopropenylbenzene | 4.3 | 3.3 |
| Vinyl isopropylbenzene or ethyl isopropenylbenzene | 6.3 | 5.5 |
| Dimethylnaphthalenes | | |
| Diisopropenylbenzenes | 9.4 | 9.5 |
| Isopropyl isopropenylbenzenes | 27.5 | 23.1 |
| Diisopropylbenzenes | 45.6 | 50.2 |
| Lb. divinylbenzene/100 lb. HC feed | 0.2 | 0.9 |
| Lb. divinylbenzene/100 lb. HC consumed | 0.3 | 1.5 |
| Lb. isopropyl isopropenylbenzene/100 lb. HC feed | 24.3 | 18.6 |
| Lb. isopropyl isopropenylbenzene/100 lb. HC consumed | 40.7 | 31.2 |
| Lb. diisopropenylbenzene/100 lb. HC feed | 8.3 | 7.6 |
| Lb. diisopropenylbenzene/100 lb. HC consumed | 13.9 | 12.8 |

EXAMPLE 4

A procedure similar to that of Example 1 was followed differing in that a non-catalytic or thermal reaction was used. Conversion and yield data are given in following Table IV.

Table IV
THERMAL DEMETHANATION AND CYCLIZATION WITH o-DIISOPROPYLBENZENE

| | | | |
|---|---|---|---|
| HC Input (g.) | | 66 | |
| Steam Input (g.) | | 216 | |
| Hours Operation | | 3.2 | |
| HC Recovered (g.) | | 56 | |

| Operating Temp., °C | 650 | 675 | 700 |
|---|---|---|---|
| Crude Product Analysis (wt. percent): | | | |
| Toluene | 0.8 | 1.3 | 2.2 |
| Styrene | | 0.6 | 2.5 |
| Ethylbenzene | 0.9 | 1.6 | 2.4 |
| Indene | 1.5 | 2.9 | 4.7 |
| Methylstyrenes | 1.3 | 5.3 | 9.2 |
| Isopropylbenzene | 1.5 | 4.4 | 6.4 |
| Naphthalene | 0.6 | 1.0 | 2.8 |
| Divinylbenzene | 1.0 | 2.4 | 4.5 |
| Isopropenyltoluene or ethylvinylbenzene | | 1.4 | 6.4 |
| Isopropyltoluene or diethylbenzene | | 1.0 | 1.6 |
| Methylnaphthalene | 0.4 | 1.5 | 3.2 |
| Vinyl isopropenylbenzene | 1.1 | 3.2 | 5.2 |
| Vinyl isopropylbenzene or ethyl isopropenylbenzene | 5.2 | 9.8 | 10.3 |
| Dimethylnaphthalene | | 0.2 | 0.4 |
| Diisopropenylbenzene | 0.3 | 0.5 | 0.6 |
| Isopropyl isopropenylbenzene | 2.6 | 2.4 | 1.8 |
| Diisopropylbenzene | 82.8 | 60.5 | 35.8 |
| Lb. naphthalenes/100 lb. feed | 0.9 | 2.3 | 5.4 |
| Lb. naphthalenes/100 lb. HC consumed | 3.0 | 4.7 | 7.8 |
| Lb. indene/100 lb. feed | 1.3 | 4.5 | 7.8 |
| Lb. indene/100 lb. HC consumed | 4.4 | 9.3 | 11.2 |
| Lb. isopropyl isopropenylbenzene/100 lb. feed | 2.2 | 2.0 | 1.6 |
| Lb. isopropyl isopropenylbenzene/100 lb. HC consumed | 7.4 | 4.1 | 2.2 |
| Lb. diisopropenylbenzene/100 lb. feed | 0.3 | 0.4 | 0.5 |
| Lb. diisopropenylbenzene/100 lb. HC consumed | 1.0 | 0.8 | 0.7 |

EXAMPLE 5

A procedure similar to that of Example 1 was followed differing in that a non-catalytic reaction was carried out in the absence of diluent. Conversion and yield data are given in following Table V.

Table V
THERMAL DEMETHANATION AND CYCLIZATION WITH o-DIISOPROPYLBENZENE WITHOUT DILUENT

| | |
|---|---|
| HC input (g.) | 22 |
| Hours' operation | 0.9 |
| HC recovered (g.) | 15 |
| Operating temp., °C | 675 |
| Crude product analysis (wt. percent): | |
| Toluene | 3.1 |
| Styrene | 2.8 |
| Ethylbenzene | 8.7 |
| Indene | 8.4 |
| Methylstyrenes | 9.7 |
| Isopropylbenzene | 7.7 |
| Naphthalene | 9.2 |
| Divinylbenzene | 6.3 |
| Isopropenyltoluene or ethylvinylbenzene | 6.7 |
| Isopropyltoluene or diethylbenzene | 1.7 |
| Methylnaphthalene | 8.1 |

Table V—Continued

| | |
|---|---|
| Vinyl isopropenylbenzene | 5.3 |
| Vinyl isopropylbenzene or ethyl isopropenylbenzene | 6.0 |
| Dimethylnaphthalene | 1.1 |
| Diisopropenylbenzene | 0.5 |
| Isopropyl isopropenylbenzene | 0.9 |
| Diisopropylbenzene | 13.8 |
| Lb. naphthalenes/100 lb. feed | 12.6 |
| Lb. naphthalenes/100 lb. HC consumed | 13.9 |
| Lb. indene/100 lb. feed | 5.7 |
| Lb. indene/100 lb. HC consumed | 6.3 |
| Lb. isopropyl isopropenylbenzene/100 lb. feed | 0.6 |
| Lb. isopropyl isopropenylbenzene/100 lb. HC consumed | 0.7 |
| Lb. diisopropenylbenzene/100 lb. feed | 0.3 |
| Lb. diisopropenylbenzene/100 lb. HC consumed | 0.3 |

What is claimed is:

1. Method for making indenes and naphthalenes by passing a feed of the group consisting of o-diisopropylbenzene, 3,4-diisopropyltoluene and mixtures thereof through a reaction zone maintained at a temperature ranging between 525° and 800° C. at a throughput rate between 5 and 150 grams of feed per 100 ml. of reaction zone per hour whereby demethanation and cyclization of the feed are promoted and recovering indenes and naphthalenes from the process effluent.

2. Method of claim 1 wherein the reaction zone is provided with a dehydrogenation catalyst.

3. Method of claim 1 wherein an inert diluent is used.

4. Method of claim 1 wherein steam diluent is used.

5. Method of claim 1 wherein the reaction zone is provided with a dehydrogenation catalyst and steam diluent is used.

6. Method of claim 1 wherein the feed is o-diisopropylbenzene, the reaction zone is provided with an activated alumina catalyst, the reaction temperature is 700° C. and steam is the diluent.

7. Method of claim 1 wherein the feed is o-diisopropylbenzene, the reaction zone is provided with a zinc oxide-ferric oxide self-reactivating catalyst, the reaction temperature is 700° C. and steam is the diluent.

8. Method of claim 1 wherein the feed is o-diisopropylbenzene, the reaction is carried out at 700° C. in the absence of catalyst and wherein steam is the diluent.

9. Method of claim 1 wherein the feed is o-diisopropylbenzene and the reaction is carried out at 675° C. in the absence of catalyst and of diluent.

References Cited by the Examiner
UNITED STATES PATENTS

| | | | | |
|---|---|---|---|---|
| 2,531,328 | 11/50 | Elwell | | 260—668 |
| 2,857,440 | 10/58 | Amos et al. | | 260—672 |
| 2,901,518 | 8/59 | Raley | | 260—668 |
| 3,091,651 | 5/63 | Soderquist et al. | | 260—668 |

OTHER REFERENCES

Hurd et al.: J.A.C.S., vol. 56, pp. 447–9, February 1934.

ALPHONSO D. SULLIVAN, *Primary Examiner*.